United States Patent

Sharifian et al.

[11] Patent Number: 5,904,823
[45] Date of Patent: May 18, 1999

[54] METHODS OF PURIFYING HYDROXYLAMINE SOLUTIONS AND CONVERTING HYDROXYLAMINE SALTS TO HYDROXYLAMINE

[75] Inventors: Hossein Sharifian, Austin, Tex.; Christopher D. Shay, Stillwater, Okla.

[73] Assignee: Sachem, Inc., Austin, Tex.

[21] Appl. No.: 08/827,661

[22] Filed: Apr. 10, 1997

[51] Int. Cl.$^6$ .................................................. C25B 1/34
[52] U.S. Cl. ......................... 204/530; 204/522; 204/537; 205/437
[58] Field of Search ................................... 204/522, 523, 204/530, 534, 537; 205/437

[56] References Cited

U.S. PATENT DOCUMENTS

| | | | |
|---|---|---|---|
| 4,321,313 | 3/1982 | Langer et al. | 429/13 |
| 4,645,579 | 2/1987 | Weiss et al. | 204/182.4 |
| 4,818,353 | 4/1989 | Langer et al. | 204/74 |
| 4,849,073 | 7/1989 | Dotson et al. | 204/101 |
| 4,968,394 | 11/1990 | Dotson et al. | 204/101 |
| 5,281,311 | 1/1994 | Sharifian et al. | 204/101 |
| 5,447,610 | 9/1995 | Sharifian | 204/101 |

FOREIGN PATENT DOCUMENTS

| | | | |
|---|---|---|---|
| 577100A1 | 1/1994 | European Pat. Off. | C01B 21/14 |
| 2602802 | 8/1987 | France . | |
| 4428255 | 2/1996 | Germany | C25B 1/00 |
| 4021507 | 1/1992 | Japan | C01B 21/14 |

OTHER PUBLICATIONS

European Search Report for European Patent Application Serial No. 98302671.7 dated Sep. 24, 1998.
Bathia et al., "Hydroxylamine Production by Electroreduction of a Nitric Oxide in a Trickle Bed Cell", *The Canadian Journal of Chemical Engineering*, vol. 57, No. 5, pp. 631–637, 1979. No month available.
Colucci et al., "The Electro Reduction of Nitric Oxide on Bulk Platinum in Acid Solutions", *Electrochimica Acta*, vol. 4, pp. 521–528, 1985. No month available.

*Primary Examiner*—Kathryn Gorgos
*Assistant Examiner*—Thomas H. Parsons
*Attorney, Agent, or Firm*—Renner, Otto, Boisselle & Sklar

[57] ABSTRACT

In one embodiment, the present invention provides a method of preparing hydroxylamine from a hydroxylammonium salt solution, including providing an electrochemical cell containing an anode, a cathode, a cation selective membrane and an anion selective membrane, wherein the cation selective membrane is positioned between the cathode and the anion selective membrane, and the anion selective membrane is positioned between the cation selective membrane and the anode, thereby defining a feed compartment between the cation selective membrane and the anion selective membrane, a recovery compartment between the cathode and the cation selective membrane, and an acid compartment between the anion selective membrane and the anode; charging a first solution to the acid compartment and a second solution the recovery compartment; charging the hydroxylammonium salt solution to the feed compartment; passing a current through the cell to produce hydroxylamine in the recovery compartment; and recovering hydroxylamine from the recovery compartment.

32 Claims, 3 Drawing Sheets

5,904,823

METHODS OF PURIFYING HYDROXYLAMINE SOLUTIONS AND CONVERTING HYDROXYLAMINE SALTS TO HYDROXYLAMINE

TECHNICAL FIELD

The present invention relates to purifying hydroxylamine solutions and converting hydroxylammonium salts to hydroxylamine using an electrochemical cell.

BACKGROUND OF THE INVENTION

Hydroxylamine and hydroxylammonium salts are compounds which have a variety of applications. For instance, hydroxylammonium nitrate may be used as a component of liquid propellant and as a reducing agent in photographic operations. In some of these applications, it is desirable that a hydroxylammonium salt solution of high purity be available.

Hydroxylamine is useful as an intermediary in chemical processes especially in the pharmaceutical and agricultural industries. It is also useful in stripper formulations. Stripper formulations may be used to remove photoresists from or clean a substrate. For example, hydroxylamine stripper solutions are used to remove polyimide coatings from metal foils. Hydroxylamine stripper solutions are extensively utilized in the printed circuit board and semiconductor industries. Frequently, solutions of hydroxylamine, especially solutions prepared from hydroxylammonium salts, contain undesirable amounts of impurities such as salts, acids, metals and unwanted organic materials. Thus, there also exists a need for hydroxylamine solutions having high purity.

There exist several production methods to manufacture hydroxylamine and hydroxylammonium salts. Some of these methods, however, do not provide hydroxylamine solutions or hydroxylammonium salt solutions of high purity which some applications of the compounds require. Consequently, there remains a substantial demand for large quantities of high purity hydroxylamine solutions and hydroxylammonium salt solutions.

SUMMARY OF THE INVENTION

In one embodiment, the present invention provides a method of preparing hydroxylamine from a hydroxylammonium salt solution, including providing an electrochemical cell containing an anode, a cathode, a cation selective membrane and an anion selective membrane, wherein the cation selective membrane is positioned between the cathode and the anion selective membrane, and the anion selective membrane is positioned between the cation selective membrane and the anode, thereby defining a feed compartment between the cation selective membrane and the anion selective membrane, a recovery compartment between the cathode and the cation selective membrane, and an acid compartment between the anion selective membrane and the anode; charging a first solution to the acid compartment and a second solution to the recovery compartment; charging the hydroxylammonium salt solution to the feed compartment; passing a current through the cell to produce hydroxylamine in the recovery compartment; and recovering hydroxylamine from the recovery compartment.

In another embodiment, the present invention provides a method of preparing hydroxylamine from a hydroxylammonium salt solution, including providing an electrochemical cell containing an anode, a cathode, a cation selective membrane and a bipolar membrane, the bipolar membrane having an anion selective side facing the anode and a cation selective side facing the cathode, wherein the cation selective membrane is positioned between the anode and the bipolar membrane, and the bipolar membrane is positioned between the cation selective membrane and the cathode, thereby defining a feed compartment between the cation selective membrane and the anode, a recovery compartment between the bipolar membrane and the cation selective membrane, and a water compartment between the bipolar membrane and the cathode; charging an ionic solution to the water compartment, and a solution to the recovery compartment; charging the hydroxylammonium salt solution to the feed compartment; passing a current through the electrochemical cell to produce hydroxylamine in the recovery compartment; and recovering the hydroxylamine from the recovery compartment.

In yet another embodiment, the present invention provides a method of preparing hydroxylamine from a hydroxylammonium salt solution, including providing an electrochemical cell containing an anode, a cathode, a anion selective membrane and a bipolar membrane, the bipolar membrane having an anion selective side facing the anode and a cation selective side facing the cathode, wherein the anion selective membrane is positioned between the anode and the bipolar membrane, and the bipolar membrane is positioned between the anion selective membrane and the cathode, thereby defining a feed-recovery compartment between the anion selective membrane and the bipolar membrane, a water compartment between the bipolar membrane and the cathode, and an acid compartment between the anion selective membrane and the anode; charging an ionic solution to the water compartment, and a solution to the acid compartment; charging the hydroxylammonium salt solution to the feed-recovery compartment; passing a current through the electrochemical cell to produce hydroxylamine in the feed-recovery compartment; and recovering hydroxylamine from the feed-recovery compartment.

As a result of the present invention, it is possible to obtain hydroxylamine solutions of high purity.

DESCRIPTION OF PREFERRED EMBODIMENTS

Figure 1:
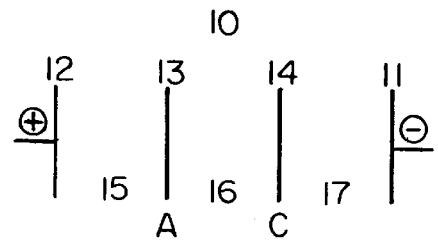
FIG. 1 is a schematic representation of a three-compartment electrochemical cell containing one unit cell in accordance with the invention.

The term "hydrocarbyl" is used herein to include substantially hydrocarbyl groups as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein. Examples of hydrocarbyl substituents which may be useful in connection with the present invention include alkyl, alkenyl, alicyclic and aromatic substituents.

Hydroxylamine may be represented by the formula

wherein $R^1$ and $R^2$ are independently hydrogen or hydrocarbyl containing 1 to about 6 carbon atoms, and preferably independently hydrogen or hydrocarbyl containing 1 to about 3 carbon atoms.

Hydroxylammonium salts may be represented by the formula

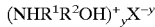

wherein $R^1$ and $R^2$ are independently hydrogen or hydrocarbyl containing 1 to about 6 carbon atoms, and preferably independently hydrogen or hydrocarbyl containing 1 to about 3 carbon atoms, X is an anion of an acid or salt, and y is a number equal to the valence of X. Specific examples of anions include $Cl^-$, $Br^-$, $SO_4^{-2}$, $HSO_4^-$, $PO_4^{-3}$, $H_2PO_4^{-1}$, $HPO_4^{-2}$, $NO_3^-$, $HCO_3^-$, $CO_3^{-2}$, $ClO^-$, $H_2CO_2^-$, $CH_3CO_2^-$, $CH_3CH_2CO_2^-$, etc. Specific examples of $R^1$ and $R^2$ include hydrogen, methyl, ethyl, propyl including isopropyl, butyl, etc. In embodiments where at least one of $R^1$ and $R^2$ are hydrocarbyl, the hydroxylamine may be an organic hydroxylamine. Hydroxylammonium salts also include corresponding hydroxylamine compounds such as hydroxylamine hydrochlorides, hydroxylamine sulfates, hydroxylamine phosphates and so on.

Specific examples of inorganic acids, represented by formula $H_yX$, which may provide the anion of a hydroxylammonium salt include nitric acid, halogen acids such as hydrofluoric acid, hydrochloric acid, hydrobromic acid and hydriodic acid, sulfuric acid, sulfurous acid, perchloric acid, boric acid and phosphorus acids such as phosphorous acid and phosphoric acid. Nitric acid and sulfuric acid are preferred inorganic acids. Examples of organic acids represented by the formula $H_yX$ which may provide the anion of a hydroxylammonium salt include carboxylic and polycarboxylic acids such as formic acid, acetic acid, propionic acid, citric acid, oxalic acid, etc.; organic phosphorus acids such as dimethylphosphoric acid and dimethylphosphinic acid; or sulfonic acids such as methanesulfonic acid, ethanesulfonic acid, 1-pentanesulfonic acid, 1-hexanesulfonic acid, 1-heptanesulfonic acid, benzenesulfonic acid, toluenesulfonic acid, etc.

Specific examples of hydroxylammonium salts include hydroxylammonium sulfate, hydroxylammonium nitrate, hydroxylammonium chloride, hydroxylammonium fluoride, hydroxylammonium formate, hydroxylammonium acetate, hydroxylammonium phosphate, hydroxylammonium methylsulfonate, hydroxylammonium toluene sulfonate, hydroxylammonium carbonate, etc.

Examples of organic hydroxylammonium salts include methylhydroxylammonium salts, ethylhydroxylammonium salts, propylhydroxylammonium salts, isopropylhydroxylammonium salts, and diethylhydroxylammonium salts. Specific embodiments of organic hydroxylammonium salts include methylhydroxylamine hydrochloride, ethylhydroxylamine hydrochloride, propylhydroxylamine hydrochloride, isopropylhydroxylamine hydrochloride, and diethylhydroxylamine hydrochloride and other corresponding salts.

Various methods of providing hydroxylamine and/or hydroxylammonium salts are described in U.S. Pat. Nos. 4,321,313; 4,645,579; 4,849,073; 4,968,394; 5,281,311 and 5,447,610; French Patent 2,602,802; and a number of publications listed below all of which are hereby incorporated by reference for their relevant disclosure. French Patent 2,602,802 is directed to an electrolytic process to directly produce solutions of hydroxylammonium nitrate from nitric acid. U.S. Pat. No. 4,645,579 relates to aqueous solutions of hydroxylamine which are prepared from aqueous hydroxylammonium salt solutions by electrodialysis. U.S. Pat. No. 4,849,073 relates to electrolytically producing hydroxylamine nitrate from aqueous nitric acid using a mercury cathode. U.S. Pat. No. 5,281,311 relates to an electrolytic process for making hydroxylamine or hydroxylamine salt solutions. U.S. Pat. No. 5,447,610 relates to preparing hydroxylamine and hydroxylammonium salts by electrolytically reducing a mixture containing at least one nitrogen oxide and either a neutral electrolyte to form hydroxylamine or an acidic electrolyte such as an organic or inorganic acid to form a hydroxylammonium salt. The production of hydroxylamine by the electroreduction of nitric oxide in sulfuric acid is described by L. J. J. Janssen et al in *Electrochimica Acta,* 1977, Vol. 22, pp. 27–30 and by M. L. Bathia et al in *The Canadian Journal of Chemical Engineering,* Vol. 57, October 1979, pp. 631–7. Janssen et al utilize a platinum cathode, and Bathia et al utilize a cathode bed of tungsten carbide particles. The electroreduction of nitric oxide on bulk platinum in perchloric acid and sulfuric acid solutions is described by J. A. Colucci et al in *Electrochimica Acta,* Vol. 30, No. 4, pp. 521–528, 1985. In the case of hydroxylammonium nitrate for example, some of these methods include: electrodialysis of hydroxylammonium chloride and nitrate; reaction of hydroxylammonium sulfate and barium nitrate; three-step cation exchange process employing hydroxylammonium sulfate and nitric acid; and electrolytic reduction of nitric acid.

In one embodiment, the present invention provides a method of purifying a hydroxylamine solution containing impurities. The amount of hydroxylamine in solution may be from about 0.1% (by weight) to about 50%, and preferably from about 0.5% to about 25%, and more preferably from about 1.5% to about 10%. In another embodiment, the impurities in a hydroxylamine solution include hydroxylammonium salts. The amount of hydroxylammonium salt in the hydroxylamine solution may be from about 0.1% (by weight) to about 60%, and preferably from about 0.5% to about 30%, and more preferably from about 1% to about 5%. Other impurities include unwanted organic materials and metal ions (alkali metals, alkaline earth metals and transition metals). In another embodiment, the present invention provides a method of converting hydroxylammonium salts to hydroxylamine.

The hydroxylamine or hydroxylammonium salt solution may also contain at least one stabilizer for the hydroxylamine because hydroxylamine tends to decompose to ammonia in some instances. In one embodiment, the hydroxylamine or hydroxylammonium salt solution contains at least two stabilizers. Examples of stabilizers include quinoline derivatives, thiocarboxylic acids, thiosulfates, flavones, hydroxyanthraquinones, anthocyanidines, etc. Specific examples include 8-hydroxyquinoline, morin hydrate, cyanidinium chloride, quinalizarine, benzonitrile, benzamidoxime, isocyanates, N-phenyl-N-hydroxythiourea, 2,3-didehydrohexono-1,4-lactone, alkali metal salts of ethylenediaminetetraacetic acid, and quercetin. The amount of stabilizer in the solution may range from about $5 \times 10^{-4}\%$ to about 1% by weight of the solution.

The hydroxylamine or hydroxylammonium salt solution may also contain impurities including nitrogen containing compounds such as nitrogen containing gas and ionic compounds useful as electrolytes. Examples of nitrogen containing gas include nitrogen oxide gas and nitrogen-hydrogen gas. Nitrogen oxide gas as used herein is intended to mean a gas containing nitrogen and oxygen atoms. Examples of nitrogen oxide gas include one or more of nitric oxide (NO), nitrogen dioxide ($NO_2$), nitrogen trioxide ($NO_3$), dinitrogen trioxide ($N_2O_3$), dinitrogen pentoxide $N_2O_5$.

Examples of ionic compounds include salts, metal salts and acids or any compound which forms an anion and cation when dissolved in water or an organic solution. In one embodiment, the ionic compound is an acid corresponding to the anion of the hydroxylammonium salt. Typical acids include inorganic acids such as nitric acid, halogen acids such as hydrofluoric acid, hydrochloric acid, hydrobromic acid and hydriodic acid, sulfuric acid, sulfurous acid, perchloric acid, boric acid and phosphorus acids such as phosphorous acid and phosphoric acid and organic acids including carboxylic and polycarboxylic acids such as formic acid, acetic acid, propionic acid, citric acid, oxalic acid, etc.; organic phosphorus acids such as dimethylphosphoric acid and dimethylphosphinic acid; or sulfonic acids such as methanesulfonic acid, ethanesulfonic acid, 1-pentanesulfonic acid, 1-hexanesulfonic acid, 1-heptanesulfonic acid, benzenesulfonic acid, and toluenesulfonic acid. The hydroxylamine or hydroxylammonium salt solution may also contain impurities including large molecular weight organic materials such as photoresists, ionic materials or particulate matter.

The hydroxylamine or hydroxylammonium salt solution, and any other solution described herein, may be aqueous or organic based, or mixtures thereof. In embodiments where the solutions are aqueous, it is preferable to use deionized water, although tap water may be used. Organic solutions include alcohols, glycols, and other polar organic liquids.

In accordance with the process of the present invention, hydroxylamine is prepared or purified in an electrochemical cell. The preparation or purification may be by electrolysis in an electrolytic cell or by electrodialysis in an electrodialytic cell. The electrochemical cells generally contain an anode, a cathode, and one or more unit cells assembled for operational positioning between the anode and the cathode. A number of electrolytic and electrodialytic cells containing various unit cells and multiple unit cells are described herein which are useful in the process of the present invention. Multiple unit cells may be defined by a number of compartments between an anode and a cathode (see, for example, FIGS. 5 and 13), or multiple unit cells may be defined by a number of compartments including an anode and cathode (see, for example, FIGS. 2 and 7). Multiple unit cells including an anode and cathode may take a monopolar configuration (see, for example, FIG. 2), or a bipolar configuration (see, for example, FIG. 7). There is no particular limit to the number of unit cells which can be used. Nevertheless, in one embodiment, electrochemical cells which are used according to the present invention contain from 1 to about 25 unit cells, and preferably from 1 to about 10 unit cells.

The unit cells may contain three or more compartments defined by the anode, cathode, one or more bipolar membranes and one or more dividers or separators which may be (1) nonionic microporous diffusion barriers such as screens, filters, diaphragms, etc., of controlled pore size or pore size distribution allowing certain ions to pass through the divider or separator, or (2) ionic dividers or separators such as anion selective membranes and cation selective membranes which are preferred since their use generally results in the production of hydroxide compounds of higher purity and in higher yield. The various dividers useful in the electrochemical cells used in the invention are described more fully below.

Electrochemical cells according to the invention contain at least three compartments. In one embodiment, the electrochemical cell contains a feed compartment, an acid compartment and a recovery compartment, and optionally a water compartment, purge compartment, and/or buffer compartment. In another embodiment, the electrochemical cell contains a feed compartment, a water compartment and a recovery compartment, and optionally an acid compartment, purge compartment, and/or buffer compartment. In yet another embodiment, the electrochemical cell contains a feed-recovery compartment, a water compartment and an acid compartment, and optionally a purge compartment, and/or buffer compartment.

In certain embodiments, an electrochemical cell according to the invention may have two or more of each of the compartments described above. In other embodiments, the electrochemical cell may have two or more of one or more of the compartments listed above. For example, in one embodiment, an electrochemical cell may have a feed compartment, two water compartments and a recovery compartment.

A solution is charged to each compartment. The solution may be aqueous based, alcohol based, an organic solution or combinations thereof. In a preferred embodiment, the solution charged into each compartment is an aqueous solution. The solution charged to the feed compartment or the feed-recovery compartment contains an impure solution of hydroxylamine or a hydroxylammonium salt at a certain concentration. After passing a current through the electrochemical cell, hydroxylamine may be recovered or otherwise obtained from the recovery or feed-recovery compartment at a certain concentration. In electrochemical cells containing two or more feed or feed-recovery compartments, the concentrations in the solutions charged into the feed or feed-recovery compartments may be the same or different for each feed compartment.

The water compartment contains a liquid electrolyte which is a solution of an ionic compound at a certain concentration. The water compartment containing an ionic compound serves to maintain conductivity and enable lower operating cell voltages. An ionic compound is a chemical compound that fully or partially ionizes in solution, such as an electrolyte. Examples of ionic compounds include salts, metal salts and acids or any compound which forms an anion and cation when dissolved in solution. In a preferred embodiment, the ionic compound is the same as the hydroxylammonium salt charged to the feed or feed-recovery compartment. In another embodiment, the ionic compound is different from the hydroxylammonium salt charged into the feed or feed-recovery compartment. The concentration of the ionic compound in the water compartment is in the range from about 0.01 M to about 2 M. In a preferred embodiment, the concentration is from about 0.05 M to about 1.5 M. And in a most preferred embodiment, the concentration is from about 0.1 M to about 1 M. In electrochemical cells containing two or more water compartments, the concentrations of the ionic compound in the solutions charged into the water compartments may be the same or different for each water compartment.

The recovery compartment initially is charged with a solution and preferably either deionized water or a liquid electrolyte. The solution charged to the recovery compartment may or may not contain an ionic compound. After passing a current through the electrochemical cell, hydroxylamine may be recovered or otherwise obtained from the recovery compartment at a certain concentration. After passing a current through the electrochemical cell, the concentration of hydroxylamine in the recovery compartment is generally higher than the concentration of hydroxylamine initially charged to the feed compartment, if present. In one embodiment, the concentration of hydroxylamine in the recovery compartment is above about 1 M. In another embodiment, the concentration of hydroxylamine in the recovery compartment is above about 1.5 M. In a preferred embodiment, the concentration of hydroxylamine in the recovery compartment is above about 2 M. In electrochemical cells containing two or more recovery compartments, the concentrations of hydroxylamine in the solutions recovered from the recovery compartments may be the same or different for each recovery compartment.

Generally speaking, the concentration of hydroxylamine in the solution recovered from either the feed-recovery compartment or the recovery compartment may be from about 0.1% (by weight) to about 50%, and preferably from about 0.5% to about 25%, and more preferably from about 1.5% to about 10%. The amount of hydroxylammonium salt in the solution recovered from either the feed-recovery compartment or the recovery compartment may be less than about 5% (by weight), and preferably less than about 1%, and more preferably less than about 0.1%, and in some instances, 0%.

The purge compartment initially is charged with a solution and preferably a liquid electrolyte. The solution charged to the purge compartment may or may not contain an ionic compound. After passing a current through the electrochemical cell, the ammonium cation passes through the purge compartment in embodiments where a purge compartment is used. Since most undesirable compounds do not pass through the purge compartment, the purge compartment serves to further purify hydroxylamine.

The buffer compartment initially is charged with a solution and preferably a liquid electrolyte. The solution charged to the buffer compartment may or may not contain an ionic compound. After passing a current through the electrochemical cell, impurities sometimes contaminate the recovery compartment. The buffer compartment tends to attract impurities as the impurities are sometimes prone to cross bipolar membranes. Accordingly, the buffer compartment serves to further purify the hydroxylamine.

The acid compartment initially is charged with a solution and preferably a liquid electrolyte, and more preferably a dilute acid solution. The solution charged to the acid compartment may or may not contain an ionic compound. After passing a current through the electrochemical cell, the anions are attracted to the anode thereby collected in the acid compartment.

Several embodiments of electrochemical cells which may be used in the invention will be described with reference to the figures. Although numerous embodiments of various electrochemical cells are described in the figures, it will be readily apparent to those skilled in the art that numerous embodiments not specifically described in the figures exist within the scope of the invention.

In one embodiment, an electrochemical cell is illustrated in FIG. 1, which is a schematic representation of an electrochemical cell 10 containing a cathode 11, an anode 12, and in sequence beginning at the anode 12, an anion selective membrane 13 and a cation selective membrane 14. The electrochemical cell 10 illustrated in FIG. 1 contains three compartments; namely, an acid compartment 15, a feed compartment 16, and a recovery compartment 17.

In operation of the electrochemical cell illustrated in FIG. 1, a solution containing at least one of impure hydroxylamine and an hydroxylammonium salt is charged to the feed compartment. A liquid electrolyte is charged to the acid and recovery compartments. An electrical potential is established and maintained between the anode and the cathode to produce a flow of current across the cell whereupon ammonium cations are attracted towards the cathode and pass through the cation selective membrane 14 into the recovery compartment 17. The ammonium cations combine with hydroxide ions formed at the cathode to produce the desired hydroxylamine in the recovery compartment 17. Purified hydroxylamine is recovered from the recovery compartment 17.

Figure 2:
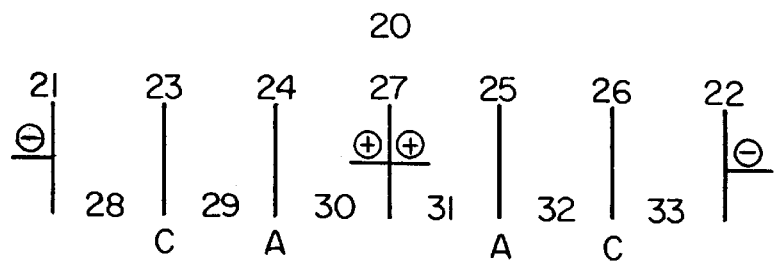
FIG. 2 is a schematic representation of an electrochemical cell containing a stack of two unit cells similar to the cell of FIG. 1 in a monopolar configuration.

In another embodiment, an electrochemical cell, and in particular a polyunit cell in a monopolar configuration similar to the cell of FIG. 1, is illustrated in FIG. 2, which is a schematic representation of an electrochemical cell 20 containing a cathode 21, a second cathode 22, an anode 27, and in sequence beginning at the cathode 21, a first cation selective membrane 23, a first anion selective membrane 24, a second anion selective membrane 25, and a second cation selective membrane 26. The electrochemical cell 20 illustrated in FIG. 2 contains six compartments; namely, a first recovery compartment 28, a first feed compartment 29, a first acid compartment 30, a second acid compartment 31, a second feed compartment 32, and a second recovery compartment 33.

In operation of the electrochemical cell illustrated in FIG. 2, a liquid electrolyte is charged to the acid compartments and the recovery compartments. A solution containing at least one of impure hydroxylamine and a hydroxylammonium salt is charged to the feed compartments. An electrical potential is established and maintained between the anode and the cathodes to produce a flow of current across the cell whereupon cations from the feed compartment are attracted to either the first cathode 21 or the second cathode 22 and pass through either the first cation selective membrane 23 or the second cation selective membrane 26 into either the recovery compartment 28 or the recovery compartment 33. The cation combines with hydroxide ions formed at the first cathode 21 or the second cathode 22 to produce the desired hydroxylamine in the recovery compartments 28 and 33. The hydroxylamine is recovered from the recovery compartments 28 and 33.

Figure 3:
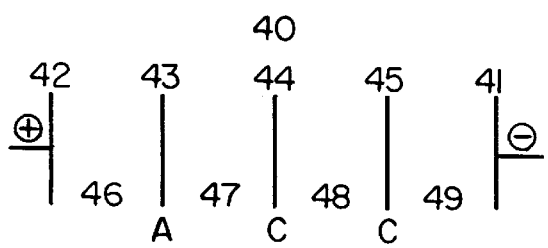
FIG. 3 is a schematic representation of a four-compartment electrochemical cell in accordance with the invention.

In another embodiment, an electrochemical cell is illustrated in FIG. 3, which is a schematic representation of an electrochemical cell 40 containing a cathode 41, an anode 42, and in sequence beginning at the anode 42, an anion selective membrane 43, a first cation selective membrane 44, and a second cation selective membrane 45. The electrochemical cell 40 illustrated in FIG. 3 contains four compartments; namely, an acid compartment 46, a feed compartment 47, a purge compartment 48 and a recovery compartment 49.

In operation of the electrochemical cell illustrated in FIG. 3, a solution containing at least one of impure hydroxylamine and a hydroxylammonium salt is charged to the feed compartment 47. A liquid electrolyte is charged to the acid, purge and recovery compartments. An electrical potential is established and maintained between the anode and the cathode to produce a flow of current across the cell whereupon ammonium cations are attracted towards the cathode and passes through the first and second cation selective membranes 44 and 45 and purge compartment 48 into the recovery compartment 49. The ammonium cation combines with hydroxide ions formed at the cathode to produce the desired hydroxylamine in the recovery compartment 49. Purified hydroxylamine is recovered from the recovery compartment 49. Acid may be recovered from the acid compartment.

Figure 4:
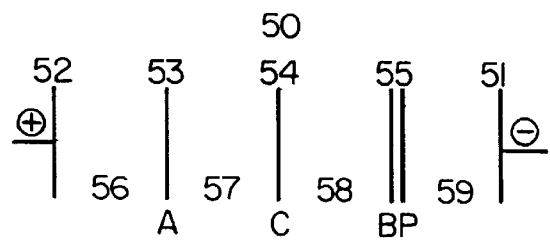
FIG. 4 is a schematic representation of another four-compartment electrochemical cell in accordance with the invention.

Another embodiment of an electrochemical cell is illustrated in FIG. 4, which is a schematic representation of an electrochemical cell 50 containing a cathode 51, an anode 52 and a unit cell containing in sequence beginning at the anode 52, an anion selective membrane 53, a cation selective membrane 54, and a bipolar membrane 55. The bipolar membrane 55 has an anion selective side (not shown) facing the anode and a cation selective side (not shown) facing the cathode. The electrochemical cell 50 contains four compartments; namely, an acid compartment 56, a feed compartment 57, a recovery compartment 58 and a water compartment 59.

In operation of the electrochemical cell illustrated in FIG. 4, a liquid electrolyte is charged to the acid compartment 56, water compartment 59 and the recovery compartment 58. A solution containing at least one of impure hydroxylamine and a hydroxylammonium salt is charged to the feed compartment 57. An electrical potential is established and maintained between the anode and the cathode to produce a flow of current across the cell whereupon ammonium cations are attracted toward the cathode and pass through the cation selective membrane 54 into the recovery compartment 58. The ammonium cations combine with hydroxide ions formed at the anion selective side of the bipolar membrane to produce the desired hydroxylamine. Impurities are attracted to the anode and pass into the acid compartment 56 or remain in the feed compartment 57. Purified hydroxylamine is formed and recovered from the recovery compartment 58.

Figure 5:
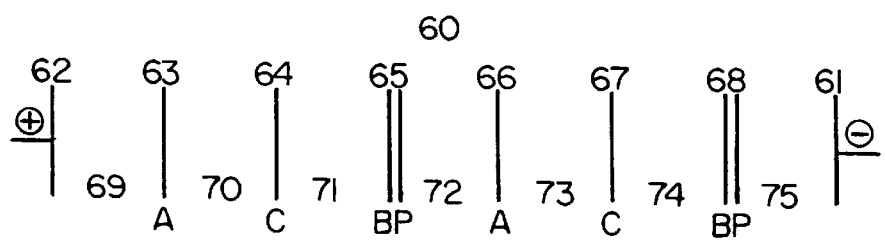
FIG. 5 is a schematic representation of an electrochemical cell containing a stack of two unit cells similar to the cell of FIG. 4.

Another embodiment of an electrochemical cell containing two units similar to the cell of FIG. 4 is illustrated in FIG. 5, which is a schematic representation of an electrochemical cell 60 containing a cathode 61, an anode 62 and in sequence beginning at the anode 62, a first anion selective membrane 63, a first cation selective membrane 64, a first bipolar membrane 65, a second anion selective membrane 66, a second cation selective membrane 67, and a second bipolar membrane 68. The bipolar membranes have an anion selective side (not shown) facing the anode and a cation selective side (not shown) facing the cathode. The electrochemical cell 60 contains seven compartments; namely, a first acid compartment 69, a first feed compartment 70, a first recovery compartment 71, a second acid compartment 72, a second feed compartment 73, a second recovery compartment 74 and a water compartment 75.

In operation of the electrochemical cell illustrated in FIG. 5, a liquid electrolyte is charged to the acid compartments, the water compartment and the recovery compartments. A solution containing at least one of impure hydroxylamine and a hydroxylammonium salt is charged to the feed compartments. An electrical potential is established and maintained between the anode and the cathode to produce a flow of current across the cell whereupon ammonium cations are attracted toward the cathode and pass through the respective cation selective membranes into the respective recovery compartments. The ammonium cations combine with hydroxide ions formed at the anion selective side of the respective bipolar membranes to produce the desired hydroxylamine. Impurities are attracted to the anode and pass into the acid compartments or remain in the feed compartments. Purified hydroxylamine is formed and recovered from the recovery compartments 71 and 74.

Figure 6:
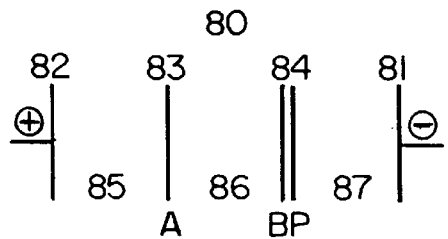
FIG. 6 is a schematic representation of another three-compartment electrochemical cell in accordance with the invention.

Another embodiment of an electrochemical cell is illustrated in FIG. 6, which is a schematic representation of an electrochemical cell 80 containing a cathode 81, an anode 82 and a unit cell containing in sequence beginning at the anode 82, an anion selective membrane 83, and a bipolar membrane 84. The bipolar membrane 84 has an anion selective side (not shown) facing the anode and a cation selective side (not shown) facing the cathode. The electrochemical cell 80 contains three compartments; namely, an acid compartment 85, a feed-recovery compartment 86 and a water compartment 87.

In operation of the electrochemical cell illustrated in FIG. 6, a liquid electrolyte is charged to the water compartment 87 and the acid compartment 85. A solution containing at least one of impure hydroxylamine and a hydroxylammonium salt is charged to the feed-recovery compartment 86. An electrical potential is established and maintained between the anode and the cathode to produce a flow of current across the cell whereupon ammonium cations are attracted toward the cathode and remain in the feed-recovery compartment 86. The ammonium cations combine with hydroxide ions formed at the anion selective side of the bipolar membrane to produce the desired hydroxylamine. Impurities are attracted to the anode and pass to the acid compartment 85. Purified hydroxylamine is formed and recovered from the feed-recovery compartment 86.

Figure 7:
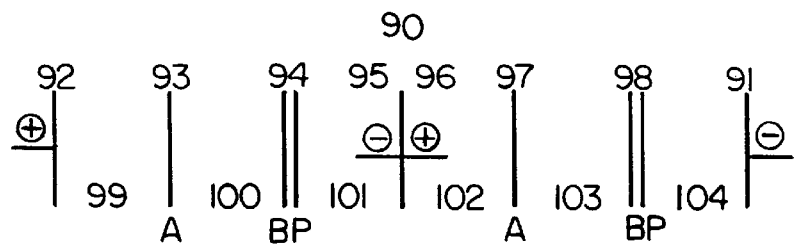
FIG. 7 is a schematic representation of an electrochemical cell containing a stack of two unit cells similar to the cell of FIG. 6 in a bipolar configuration.

Another embodiment of an electrochemical cell containing two units similar to the cell of FIG. 6 in bipolar configuration is illustrated in FIG. 7, which is a schematic representation of an electrochemical cell 90 containing a first cathode 91, a first anode 92 and in sequence beginning at the first anode 92, a first anion selective membrane 93, a first bipolar membrane 94, a second cathode 95, a second anode 96, a second anion selective membrane 97, and a second bipolar membrane 98. The bipolar membranes have an anion selective side (not shown) facing the anode and a cation selective side (not shown) facing the cathode. The electrochemical cell 90 contains six compartments; namely, a first acid compartment 99, a first feed-recovery compartment 100, a first water compartment 101, a second acid compartment 102, a second feed-recovery compartment 103 and a second water compartment 104.

In operation of the electrochemical cell illustrated in FIG. 7, a liquid electrolyte is charged to the water compartments and the acid compartments. A solution containing at least one of impure hydroxylamine and a hydroxylammonium salt is charged to the feed-recovery compartments. An electrical potential is established and maintained between the anodes and the cathodes to produce a flow of current across the cell whereupon ammonium cations are attracted toward the respective cathodes and remain in the feed-recovery compartments 100 and 103. The ammonium cations combine with hydroxide ions formed at the anion selective side of the bipolar membranes to produce the desired hydroxylamine. Impurities are attracted to the anode and pass to the respective acid compartments. Purified hydroxylamine is formed and recovered from the feed-recovery compartments.

Figure 8:
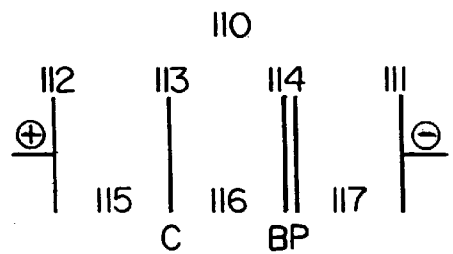
FIG. 8 is a schematic representation of another three-compartment electrochemical cell in accordance with the invention.

Another embodiment of an electrochemical cell is illustrated in FIG. 8, which is a schematic representation of an electrochemical cell 110 containing a cathode 111, an anode 112 and a unit cell containing in sequence beginning at the anode 112, a cation selective membrane 113, and a bipolar membrane 114. The bipolar membrane 114 has an anion selective side (not shown) facing the anode and a cation selective side (not shown) facing the cathode. The electrochemical cell 110 contains three compartments; namely, a feed compartment 115, a recovery compartment 116 and a water compartment 117.

In operation of the electrochemical cell illustrated in FIG. 8, a liquid electrolyte is charged to the water compartment 117 and the recovery compartment 116. A solution containing at least one of impure hydroxylamine and a hydroxylammonium salt is charged to the feed compartment 115. An electrical potential is established and maintained between the anode and the cathode to produce a flow of current across the cell whereupon ammonium cations are attracted toward the cathode and pass through the cation selective membrane 113 into the recovery compartment 116. The ammonium cations combine with hydroxide ions formed at the anion selective side of the bipolar membrane to produce the desired hydroxylamine. Impurities are attracted to the anode and thus remain in the feed compartment 115. Purified hydroxylamine is formed and recovered from the recovery compartment 116.

Figure 9:
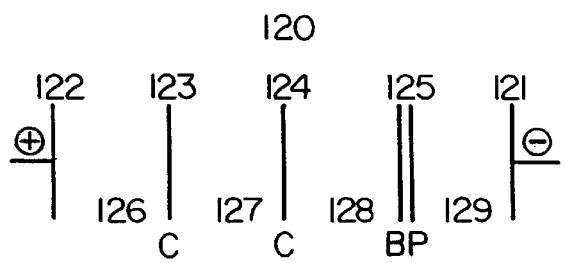
FIG. 9 is a schematic representation of another four-compartment electrochemical cell in accordance with the invention.

Another embodiment of an electrochemical cell is illustrated in FIG. 9, which is a schematic representation of an electrochemical cell 120 containing a cathode 121, an anode 122 and a unit cell containing in sequence beginning at the anode 122, a first cation selective membrane 123, a second cation selective membrane 124, and a bipolar membrane 125. The bipolar membrane 125 has an anion selective side (not shown) facing the anode and a cation selective side (not shown) facing the cathode. The electrochemical cell 120 contains four compartments; namely, a feed compartment 126, a purge compartment 127, a recovery compartment 128 and a water compartment 129.

In operation of the electrochemical cell illustrated in FIG. 9, a liquid electrolyte is charged to the water compartment 129, the purge compartment 127 and the recovery compartment 128. A solution containing at least one of impure hydroxylamine and a hydroxylammonium salt is charged to the feed compartment 126. An electrical potential is established and maintained between the anode and the cathode to produce a flow of current across the cell whereupon ammonium cations are attracted toward the cathode and pass through the first and second cation selective membranes and purge compartment into the recovery compartment 128. The ammonium cations combine with hydroxide ions formed at the anion selective side of the bipolar membrane to produce the desired hydroxylamine. Impurities are attracted to the anode and thus remain in the feed compartment 126. Purified hydroxylamine is formed and recovered from the recovery compartment 128.

Figure 10:
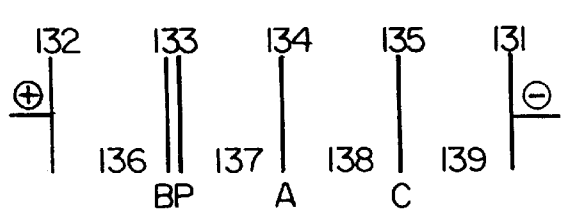
FIG. 10 is a schematic representation of another four-compartment electrochemical cell in accordance with the invention.

In another embodiment, an electrochemical cell is illustrated in FIG. 10, which is a schematic representation of an electrochemical cell 130 containing a cathode 131, an anode 132, and in sequence beginning at the anode 132, a bipolar membrane 133, an anion selective membrane 134 and a cation selective membrane 135. The electrochemical cell 130 illustrated in FIG. 10 contains four compartments; namely, a water compartment 136, an acid compartment 137, a feed compartment 138, and a recovery compartment 139.

In operation of the electrochemical cell illustrated in FIG. 10, a solution containing at least one of impure hydroxylamine and a hydroxylammonium salt is charged to the feed compartment. A liquid electrolyte is charged to the acid, water and recovery compartments. An electrical potential is established and maintained between the anode and the cathode to produce a flow of current across the cell whereupon ammonium cations are attracted towards the cathode and pass through the cation selective membrane 135 into the recovery compartment 139. The ammonium cations combine with hydroxide ions formed at the cathode to produce the desired hydroxylamine in the recovery compartment 139. Purified hydroxylamine is recovered from the recovery compartment.

Figure 11:
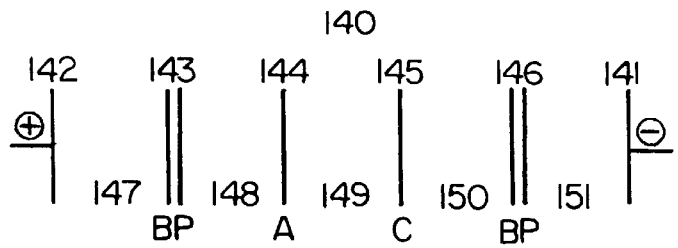
FIG. 11 is a schematic representation of a five-compartment electrochemical cell in accordance with the invention.

In another embodiment, an electrochemical cell is illustrated in FIG. 11, which is a schematic representation of an electrochemical cell 140 containing a cathode 141, an anode 142, and in sequence beginning at the anode 142, a first bipolar membrane 143, an anion selective membrane 144, a cation selective membrane 145 and a second bipolar membrane 146. The electrochemical cell 140 illustrated in FIG. 11 contains five compartments; namely, a first water compartment 147, an acid compartment 148, a feed compartment 149, a recovery compartment 150, and a second water compartment 151.

In operation of the electrochemical cell illustrated in FIG. 11, a solution containing at least one of impure hydroxylamine and an hydroxylammonium salt is charged to the feed compartment. A liquid electrolyte is charged to the acid, water and recovery compartments. An electrical potential is established and maintained between the anode and the cathode to produce a flow of current across the cell whereupon ammonium cations are attracted towards the cathode and pass through the cation selective membrane 145 into the recovery compartment 150. The ammonium cations combine with hydroxide ions formed at the anion side of the second bipolar membrane to produce the desired hydroxylamine in the recovery compartment 150. Purified hydroxylamine is recovered from the recovery compartment.

Figure 12:
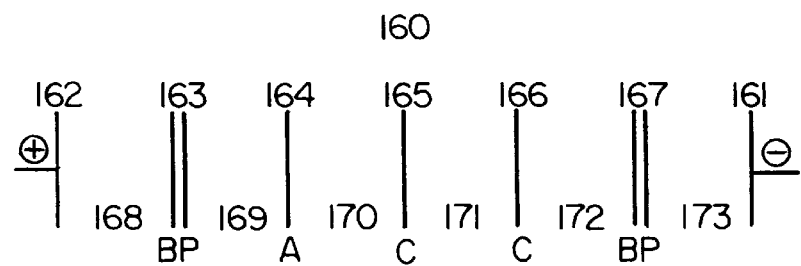
FIG. 12 is a schematic representation of a six-compartment electrochemical cell in accordance with the invention.

In another embodiment, an electrochemical cell is illustrated in FIG. 12, which is a schematic representation of an electrochemical cell 160 containing a cathode 161, an anode 162, and in sequence beginning at the anode 162, a first bipolar membrane 163, an anion selective membrane 164, a first cation selective membrane 165, a second cation selective membrane 166 and a second bipolar membrane 167. The electrochemical cell 160 illustrated in FIG. 12 contains six compartments; namely, a first water compartment 168, an acid compartment 169, a feed compartment 170, a purge compartment 171, a recovery compartment 172, and a second water compartment 173.

In operation of the electrochemical cell illustrated in FIG. 12, a solution containing at least one of impure hydroxylamine and a hydroxylammonium salt is charged to the feed compartment. A liquid electrolyte is charged to the acid, water, purge and recovery compartments. An electrical potential is established and maintained between the anode and the cathode to produce a flow of current across the cell whereupon ammonium cations are attracted towards the cathode and pass through the first and second cation selective membranes and purge compartment into the recovery compartment 172. The ammonium cations combine with hydroxide ions formed at the anion side of the second bipolar membrane to produce the desired hydroxylamine in the recovery compartment 172. Purified hydroxylamine is recovered from the recovery compartment.

Figure 13:
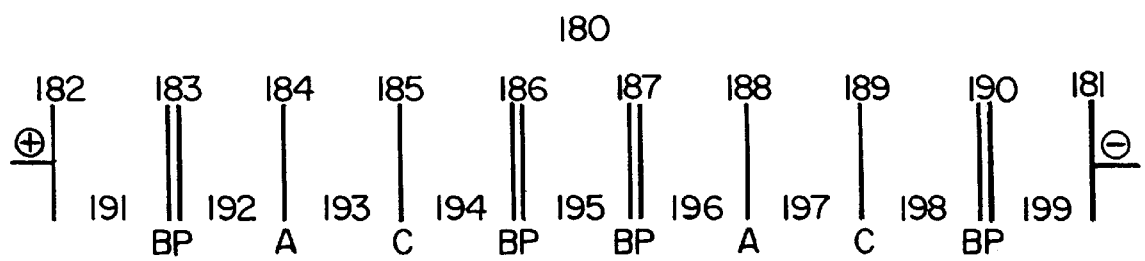
FIG. 13 is a schematic representation of an electrochemical cell containing a stack of two unit cells similar to the cell of FIG. 11.

In another embodiment, an electrochemical cell is illustrated in FIG. 13, which is a schematic representation of an electrochemical cell 180 containing a cathode 181, an anode 182, and in sequence beginning at the anode 182, a first bipolar membrane 183, a first anion selective membrane 184, a first cation selective membrane 185, a second bipolar membrane 186, a third bipolar membrane 187, a second anion selective membrane 188, a second cation selective membrane 189 and a fourth bipolar membrane 190. The electrochemical cell 180 illustrated in FIG. 13 contains nine compartments; namely, a first water compartment 191, a first acid compartment 192, a first feed compartment 193, a first recovery compartment 194, a buffer compartment 195, a second acid compartment 196, a second feed compartment 197, a second recovery compartment 198, and a second water compartment 199.

In operation of the electrochemical cell illustrated in FIG. 13, a solution containing at least one of impure hydroxylamine and a hydroxylammonium salt is charged to the first and second feed compartments 193 and 197. A liquid electrolyte is charged to the acid, water, buffer and recovery compartments. An electrical potential is established and maintained between the anode and the cathode to produce a flow of current across the cell whereupon ammonium cations are attracted towards the cathode and pass through the respective first and second cation selective membranes into the respective recovery compartments. The ammonium cations combine with hydroxide ions formed at the anion side of the second or fourth bipolar membrane to produce the desired hydroxylamine in the respective recovery compartments. Purified hydroxylamine is recovered from the recovery compartments.

In some embodiments, it may be difficult to remove undesirable, small or trace amounts of hydroxylammonium salts from the purified hydroxylamine solution from the recovery compartment. In these instances, it may be desirable to employ a reverse osmosis unit, an ion exchange system (containing anionic or cationic exchange resins) or a distillation apparatus to remove left over salts and further purify the recovered hydroxylamine solution.

Various materials can be used as anodes in the electrochemical cells. For example, the anode may be made of metals such as titanium-coated electrodes, graphite, tantalum, zirconium, hafnium or alloys of the same. Generally, the anodes will have a non-passivable and catalytic film which may comprise metallic noble metals such as platinum, iridium, rhodium or alloys thereof, or a mixture of electroconductive oxides containing at least one oxide or mixed oxides of a noble metal such as platinum, iridium, ruthenium, palladium or rhodium. In one embodiment, the anode is a dimensionally stable anode such as an anode having a titanium base with ruthenium and/or iridium oxides thereon.

Various materials which have been used as cathodes in electrochemical cells can be included in the cells used in the above and other embodiments of the present invention. Cathode materials include nickel, iron, stainless steel, nickel plated titanium, graphite, carbon steel (iron) or alloys thereof etc. The term "alloy" is used in a broad sense and includes intimate mixtures of two or more metals as well as one metal coated onto another metal. In some instances, nickel, stainless steel and platinum promote the decomposition of hydroxylamine to ammonia. Accordingly, in some embodiments, it is preferable to use a gas-diffusion cathode. A gas-diffusion cathode may comprise a conventional cathode structure formed of a suitable porous hydrophobic material such as polytetrafluoroethylene (PTFE).

The electrochemical cell utilized in the process of the present invention contains at least one divider or separator, such as an ionic selective membrane, and at least one bipolar membrane. Compartments are defined as the area between two of: dividers and/or bipolar membranes and/or the anode and/or cathode. The dividers and/or bipolar membranes function as diffusion barriers and/or gas separators.

The dividers or separators which can be utilized in the present invention can be selected from a wide variety of microporous diffusion barriers, screens, filters, diaphragms, etc., which contain pores of the desired size to allow ammonium cations, to migrate toward the cathode. The microporous dividers can be prepared from various materials including plastics such as polyethylene, polypropylene and Teflon® (polytetrafluorethylene), ceramics, etc. Microporous dividers such as nonionic dividers can be used, for example, in addition to the dividers listed in the Figures. Specific examples of commercially available microporous separators include: Celanese Celgard and Norton Zitex. Microporous separators are particularly useful when the process of the present invention is utilized to purify the higher molecular weight compounds.

The cation selective membranes used in the cells and the process of the invention may be any of those which have been used in the electrochemical purification or preparation of hydroxylamine. Preferably, the cation-exchange membranes should contain a highly durable material such as the membranes based on the fluorocarbon series, or from less expensive materials of the polystyrene or polypropylene series. Preferably, however, the cation selective membranes useful in the present invention include fluorinated membranes containing cation selective groups such as perfluorosulfonic acid and perfluorosulfonic and/perfluorocarboxylic acid, perfluorocarbon polymer membranes such as sold by the E. I. dupont Nemours & Co. under the general trade designation "Nafion" such as DuPont's Cationic Nafion 902 membrane. Other suitable cation selective membranes include styrenedivinyl benzene copolymer membranes containing cation selective groups such as sulfonate groups, carboxylate groups, etc. Raipore Cationic R1010, (from Pall RAI), and Neosepta CMH and Neosepta CM1 membranes from Tokuyama Soda. The preparation and structure of cation selective membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various cation selective membranes which can be useful in the process of the present invention.

Any anion selective membrane may be utilized including membranes used in processes for the desalination of brackish water. Preferably, membranes should be selective with respect to the particular anions present in the cell (e.g., nitrate and halide ions). The preparation and structure of anionic membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various anionic membranes which may be useful in the process of the present invention.

Among the anion selective membranes which may be utilized and which are commercially available are the following: Amflon, Series 310, based on fluorinated polymer substituted with quaternary ammonium groups produced by American Machine and Foundry Company; Ionac MA 3148, MA 3236 and MA 3475, based on polymer substituted with quaternary ammonium derived from heterogenous polyvinylchloride produced by Ritter-Pfaulder Corp., Permutit Division; Tosflex IE-SF 34 or IE-SA 48 made by Tosoh Corp. which is a membrane designed to be stable in alkaline media; Neosepta AMH, Neosepta ACM, Neosepta AFN or Neosepta ACLE-SP from Tokuyama Soda Co.; and Selemion AMV and Selemion AAV from Asahi Glass.

The bipolar membranes used in the electrochemical cells are composite membranes containing three parts: a cation selective side or region, an anion selective side or region, and an interface between the two regions. When a direct current passes across a bipolar membrane, with the cation selective side toward or facing the cathode, electrical conduction is achieved by the transport of $H^+$ and $OH^-$ ions which are produced by the dissociation of water which occurs at the interface under the influence of an electrical field. Bipolar membranes are described, for example, in U.S. Pat. Nos. 2,829,095, 4,024,043 (single film bipolar membranes) and in U.S. Pat. No. 4,116,889 (cast bipolar membranes). The bipolar membranes useful in the process of the present invention include Neosepta Bipolar 1 by Tokuyama Soda, WSI Bipolar, and Aqualytics Bipolar membranes.

Electrochemical purifying or converting the solution containing at least one of the impure hydroxylamine and hydroxylammonium salt contained in the feed or feed-recovery compartment is effected by applying a current (generally direct current) between the anode and the cathode. The current which is passed through the electrochemical cell generally is a direct current dictated by the design and performance characteristics of the cell which are readily apparent to those skilled in the art and/or can be determined by routine experimentation. Current densities between about 0.01 and about 4 amps per square inch are generally used, and current densities between about 0.3 and about 0.7 amps per square inch are preferred. Higher or lower current densities can be used for certain specific applications. The current density is applied to the cell for a period of time which is sufficient to result in the formation of the desired amount or concentration of the hydroxylamine in the recovery or feed-recovery compartment.

During the electrochemical process, it is generally desirable that the temperature of the solutions within the cell be maintained within the range of from about 10° C. to about 80° C., preferably from about 30° C. to about 50° C., and particularly the temperature is maintained at about 40° C. during the electrochemical process. In a preferred embodiment, the inventive method is conducted under potentiostatic conditions.

The inventive method can be practiced batchwise or in a continuous operation. Circulation is effected by pumping and/or by gas evolution. Various compounds can be added periodically or continuously to maintain appropriate concentrations and/or maintain efficiency of the inventive method.

In one embodiment of the invention, the process for purifying hydroxylamine involves electrochemically reducing a nitrogen containing compound such as nitrogen oxide gas in the presence of an acidic electrolyte to form a hydroxylammonium salt. A preliminary electrochemical cell used in this embodiment contains an anode, a cathode, a bipolar membrane and a divider. In an embodiment where only hydroxylammonium salts are produced in the preliminary cell, the divider may be omitted. In a general sense, the preliminary cells may be composed of cell materials which are compatible with the materials being charged into the preliminary cells. The cell materials must be particularly able to tolerate an acidic environment. A feed compartment is located between the cathode and the bipolar membrane, a recovery compartment is located between the bipolar membrane and the divider, and an anolyte compartment is located between the divider and the anode. When only hydroxylammonium salts are produced in the preliminary cell, the preliminary electrochemical cell does not contain a divider or a recovery compartment, and the anolyte compartment is located between the bipolar membrane and the anode.

The preliminary cells may be adapted to operate at atmospheric pressure or at elevated pressures. The cathode comprises a material which exhibits electrocatalytic activity for nitrogen oxide reduction to hydroxylamine or hydroxylammonium salts. The cathode is generally a gas diffusion cathode. The gas-diffusion cathode may comprise a conventional cathode structure formed of a suitable porous hydrophobic material such as polytetrafluoroethylene (PTFE), mixed with carbon black and a catalyst.

The preliminary electrochemical cell may contain a gas chamber next to the gas diffusion cathode. Nitrogen containing gas is injected into the gas chamber and then forced through the gas diffusion cathode into the feed compartment. The anolyte compartment of the preliminary electrochemical cell contains a solution of an ionic compound. The concentration of the ionic compound in the anolyte compartment is from about 0.01 M to about 5 M. The feed compartment of the preliminary electrochemical cell contains nitrogen containing gas and an acidic electrolyte as described above. The choice of acid in the acidic electrolyte is determined by the particular hydroxylammonium salt desired to be produced. The concentration of acid in the acidic electrolyte may be from about 0.01 M to about 5 M. The recovery compartment of the preliminary electrochemical cell initially contains a solution of an ionic compound. The concentration of the ionic compound in the recovery compartment is from about 0.01 M to about 5 M.

Hydroxylammonium salt is produced in the feed compartment containing nitrogen containing gas and the acidic electrolyte by applying a current between the anode and cathode with an apparent current density of about 10 to about 500, more often from about 50 to 150 $mA/cm^2$ at about 6 volts to about 12 volts. The current is applied to the preliminary electrochemical cell for a period of time effective to produce the hydroxyammonium salt in the feed compartment at a desired concentration. The preliminary electrochemical cell may be maintained at a temperature suitable for the production of hydroxylammonium salt and hydroxylamine. The temperature is from about 1° C. to about 70° C. The concentration of the hydroxylammonium salt produced in the feed compartment is from about 0.01 M to about 5 M, and preferably from about 2 M to about 3 M.

A portion of the hydroxylammonium salt may be either recovered or physically transferred to the recovery compartment. This may be accomplished on an intermittent or continuous basis by methods known to those skilled in the art. The current applied to the preliminary electrochemical cell causes anions to migrate to the anolyte compartment and produces hydroxylamine in the recovery compartment. Hydroxylamine solution may then be obtained from the recovery compartment.

Figure 14:
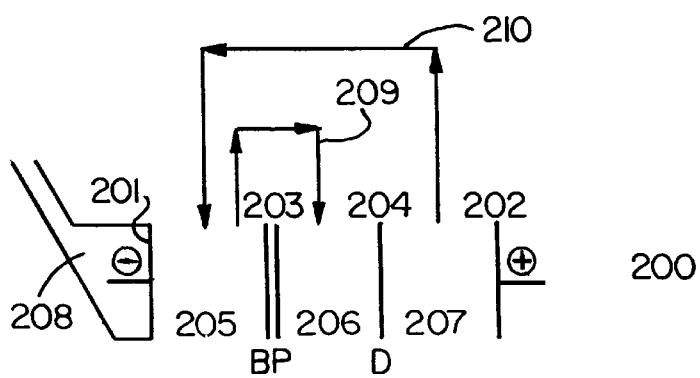
FIG. 14 is a schematic representation of a preliminary electrochemical cell in accordance with the invention.

Referring to FIG. 14, the preliminary electrochemical cell 200 is made of a cathode 201, an anode 202, and in sequence beginning at the cathode 201, a bipolar membrane 203 and a divider 204. In a preferred embodiment, the divider 204 is an anion selective membrane. The bipolar membrane 203 has an anion selective side (not shown) facing the anode and a cation selective side (not shown) facing the cathode. The preliminary electrochemical cell 200 contains three compartments; namely, a feed compartment 205, a recovery compartment 206, and an anolyte compartment 207. The cathode 201 is a gas diffusion cathode. A gas chamber 208 is positioned next to the cathode 201.

In operation of the preliminary electrochemical cell illustrated in FIG. 14, an acidic electrolyte containing an acid and water is charged to the feed compartment 205. An aqueous solution containing an ionic compound is charged to the recovery compartment 206 and the anolyte compartment 207. The ionic compound is at a first concentration in the recovery compartment and at a second concentration in the anolyte compartment 207. The gas chamber 208 is filled with nitrogen containing gas. Under pressure, the nitrogen containing gas passes through the cathode 201 and enters the feed compartment 205. The pressure should be sufficient to force the nitrogen containing gas through the gas diffusion cathode, but not significantly greater. An electrical potential is established and maintained between the anode and the cathode to produce a flow of current across the preliminary electrochemical cell whereupon a hydroxylammonium salt is produced in the feed compartment 205. A portion of the hydroxylammonium salt is either collected or physically removed from the feed compartment 205 as shown by line 209 and transferred to the recovery compartment 206. As a result of the electrical potential maintained between the anode and the cathode, the salt (anion) of the hydroxylammonium salt is attracted towards the anode 202 thereby passing through the divider 204 into the anolyte compartment 207. Hydroxylamine is produced in the recovery compartment 206. Hydroxylamine is then recovered from the recovery compartment 206.

In a preferred embodiment, a portion of the solution in the anolyte compartment may be physically removed and transferred, as shown by line 210, to the feed compartment 205. In an even more preferred embodiment, the acid solution obtained from the anolyte compartment is concentrated before it is added to the feed compartment. As the salt anion from the hydroxylammonium salt migrates through the divider 204 into the anolyte compartment 207, an acid corresponding to the salt is produced in the anolyte compartment. Since the feed compartment 205 must contain a certain minimum concentration of acid, the acid produced in the anolyte compartment may be transferred to the feed compartment thereby recycling the acid used in the methods of the present invention thereby eliminating the need to constantly or intermittently add fresh acid to the feed compartment. As a result, substantial cost and environmental benefits are realized.

A portion of the hydroxylammonium salt solution collected from the feed compartment 205 or hydroxylamine solution recovered from the recovery compartment 206 may be charged to the feed compartment or the feed-recovery compartment of an electrochemical cell, such as described in one of the FIGS. 1 to 13 or described above. Under application of a current, solution of hydroxylamine and/or hydroxylammonium salt is purified and/or converted and hydroxylamine may then be recovered from a recovery compartment or a feed-recovery compartment of the second electrochemical cell.

Figure 15:
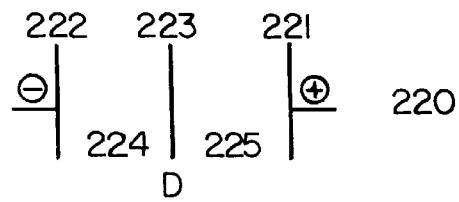
FIG. 15 is a schematic representation of another preliminary electrochemical cell in accordance with the invention.

In another embodiment of the invention, referring to FIG. 15, the process for separating a hydroxylammonium salt such as hydroxylammonium nitrate from hydroxylamine involves providing a two compartment preliminary electrochemical cell containing an anode 221, a mercury cathode 222 and a divider 223 such as a cation selective membrane thereby defining an anolyte compartment 225 between the anode and the separator and a catholyte compartment 224 between the cathode and the separator. A relatively concentrated acid solution, such as at least 5 M (for example, 13 M) nitric acid, is charged to the catholyte and less concentrated acid solution, such as 1 M nitric acid, is charged to the anolyte, and a current is applied while the temperature is maintained below about 50° C. Solution collected from the catholyte is charged to the feed compartment or the feed-recovery compartment of an electrochemical cell described in one of the Figures or described above. Under application of a current, solution of hydroxylamine and/or hydroxylammonium salt is purified and/or converted and hydroxylamine may then be recovered from a recovery compartment or a feed-recovery compartment of the second electrochemical cell. Impurities may include acid, such as nitric acid and hydroxylammonium salt such as hydroxylammonium nitrate.

The following specific examples illustrate the preparation of the hydroxylammonium salts of the present invention. Unless otherwise indicated in the examples and elsewhere in the specification and claims, all parts and percentages are by weight, temperatures are in degrees centigrade, and pressures are at or near atmospheric pressure.

EXAMPLE 1

An electrochemical cell according to FIG. 4 is provided with a Neosepta AMH anion selective membrane, a Neosepta CMH cation selective membrane and a Neosepta Bipolar 1 membrane. The anode is made of a ruthenium oxide coated titanium mesh having a surface area of 16 in$^2$. The cathode is made of stainless steel and has a surface area of 16 in$^2$. A solution containing 20% by weight of hydroxylammonium nitrate is charged to the feed compartment, a solution of 6.3% by weight of nitric acid is charged to the acid compartment, a solution of 5% by weight of hydroxylammonium nitrate is charged to the water compartment and deionized water is charged to the recovery compartment. The temperature of the recovery compartment is maintained at about 30° C. and a current of 5 amps (with a cell voltage of 20 volts) is applied. A solution of 18% hydroxylamine containing about 25 ppm nitrate ions is recovered from the recovery compartment. This operation achieves a current efficiency of 50%.

EXAMPLE 2

An electrochemical cell according to FIG. 4 is provided with a Neosepta AMH anion selective membrane, a Neosepta CMH cation selective membrane and a Neosepta Bipolar 1 membrane. The anode is made of a ruthenium oxide coated titanium mesh having a surface area of 16 in$^2$. The cathode is made of stainless steel and has a surface area of 16 in$^2$. A solution containing 33% by weight of hydroxylammonium sulfate is charged to the feed compartment, a solution of 10% by weight of sulfuric acid is charged to the acid compartment, a solution of 4% by weight of hydroxylammonium sulfate is charged to the water compartment and deionized water is charged to the recovery compartment. The temperature of the recovery compartment is maintained at about 30° C. and a current of 5 amps (with a cell voltage of 18 volts) is applied. A solution of 30% hydroxylamine containing about 50 ppm sulfate ions is recovered from the recovery compartment. This operation achieves a current efficiency of 48%.

EXAMPLE 3

An electrochemical cell according to FIG. 6 is provided with a Neosepta ACM anion selective membrane and a Neosepta Bipolar 1 membrane. The anode is made of a ruthenium oxide coated titanium mesh having a surface area of 16 in$^2$. The cathode is made of stainless steel and has a surface area of 16 in$^2$. A solution containing 20% by weight of hydroxylammonium phosphate is charged to the feed-recovery compartment, a solution of 10% by weight of phosphoric acid is charged to the acid compartment, a solution of 3% by weight of hydroxylammonium phosphate is charged to the water compartment. The temperature of the recovery compartment is maintained at about 30° C. and a current of 5 amps (with a cell voltage of 30 volts) is applied. A solution of 19% hydroxylamine containing about 650 ppm phosphate ions is recovered from the recovery compartment.

EXAMPLE 4

An electrochemical cell according to FIG. 8 is provided with a Nafion 902 cation selective membrane and a Neosepta Bipolar 1 membrane. The anode is made of a ruthenium oxide coated titanium mesh having a surface area of 16 in$^2$. The cathode is made of platinized titanium and has a surface area of 16 in$^2$. A solution of 4% by weight of hydroxylammonium sulfate is charged to the water compartment, a solution of 25% hydroxylammonium sulfate is charged to the feed compartment and deionized water charged to the recovery compartment. The temperature of the recovery compartment is maintained at about 30° C. and a current of 5 amps (with a cell voltage of 30 volts) is applied. A solution of 23% hydroxylammonium sulfate containing about 1600 ppm sulfate ions is recovered from the recovery compartment.

EXAMPLE 5

An electrochemical cell according to FIG. 11 is provided with a Bipolar 1 membrane, a Selemion AAV anion selective membrane, a Neosepta CMH cation selective membrane and a Neosepta Bipolar 1 membrane. The anode is made of a ruthenium oxide coated titanium mesh having a surface area of 16 in$^2$. The cathode is made of stainless steel and has a surface area of 16 in$^2$. A solution containing 22% by weight of hydroxylammonium nitrate is charged to the feed compartment, a solution of 6.3% by weight of nitric acid is charged to the acid compartment, a solution of 4% by weight of hydroxylammonium nitrate is charged to the catholyte water compartment, a solution of 10% of hydroxylammonium nitrate is charged to the anolyte water compartment and deionized water is charged to the recovery compartment. The temperature of the recovery compartment is maintained at about 20° C. and a current of 4 amps (with a cell voltage of 24 volts) is applied. A solution of 20% hydroxylamine containing about 10 ppm nitrate ions is recovered from the recovery compartment. This operation achieves a current efficiency of 44%.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of preparing hydroxylamine from a hydroxylammonium salt solution, comprising:

(A) providing an electrochemical cell comprising an anode, a cathode, a cation selective membrane and an anion selective membrane, wherein the cation selective membrane is positioned between the cathode and the anion selective membrane, and the anion selective membrane is positioned between the cation selective membrane and the anode, thereby defining a feed compartment between the cation selective membrane and the anion selective membrane, a recovery compartment between the cathode and the cation selective membrane, and an acid compartment between the anion selective membrane and the anode;

(B) charging a first solution to the acid compartment and a second solution to the recovery compartment;

(C) charging the hydroxylammonium salt solution to the feed compartment;

(D) passing a current through the cell to produce hydroxylamine in the recovery compartment; and (E) recovering hydroxylamine from the recovery compartment.

2. The method of claim 1, wherein the electrochemical cell further comprises a bipolar membrane positioned between the anion selective membrane and the anode, the bipolar membrane having an anion selective side facing the anode and a cation selective side facing the cathode, thereby defining a recovery compartment between the cation selective membrane and the cathode, a feed compartment between the anion selective membrane and the cation selective membrane, an acid compartment between the bipolar membrane and the anion selective membrane, and a water compartment between the anode and the bipolar membrane, wherein an ionic solution is charged to the water compartment.

3. The method of claim 1, wherein the electrochemical cell further comprises a bipolar membrane positioned between the cation selective membrane and the cathode, the bipolar membrane having an anion selective side facing the anode and a cation selective side facing the cathode, thereby defining a recovery compartment between the cation selective membrane and the bipolar membrane, a feed compartment between the anion selective membrane and the cation selective membrane, an acid compartment between the anode and the anion selective membrane, and a water compartment between the cathode and the, bipolar membrane, wherein an ionic solution is charged to the water compartment.

4. The method of claim 1, wherein the hydroxylammonium salt solution further comprises hydroxylamine.

5. The method of claim 1, wherein the hydroxylammonium salt solution comprises at least one of hydroxylammonium nitrate, hydroxylammonium sulfate, hydroxylammonium phosphate, and hydroxylammonium chloride.

6. The method of claim 1, wherein the hydroxylammonium salt solution comprises at least one of methylhydroxylamine hydrochloride, ethylhydroxylamine hydrochloride, propylhydroxylamine hydrochloride, isopropylhydroxylamine hydrochloride, and diethylhydroxylamine hydrochloride.

7. The method of claim 1, wherein the hydroxylammonium salt solution further comprises at least one of nitric acid, sulfuric acid, phosphoric acid and hydrochloric acid.

8. The method of claim 1, wherein the hydroxylammonium salt solution further comprises at least one stabilizer.

9. The method of claim 1, wherein the hydroxylammonium salt solution is formed by an electrochemical process involving converting a nitrogen containing compound to a hydroxylammonium salt.

10. The method of claim 1 further comprising passing the recovered hydroxylamine through a reverse osmosis unit, ion exchange resin or distillation apparatus.

11. The method of claim 1, wherein the method is conducted under potentiostatic conditions.

12. The method of claim 1, wherein the cathode comprises a gas diffusion cathode.

13. The method of claim 1, wherein the hydroxylammonium salt solution is obtained from a process including the steps of:
    providing an electrochemical cell comprising an anode, a mercury cathode and a separator thereby defining an anolyte compartment between the anode and the separator and a catholyte compartment between the cathode and the separator;
    charging a concentrated nitric acid solution to the catholyte compartment and a dilute nitric acid solution to the anolyte compartment;
    applying a current while maintaining a temperature below about 50° C.; and
    obtaining the hydroxylammonium salt solution from the catholyte compartment.

14. A method of preparing hydroxylamine from a hydroxylammonium salt solution, comprising:
    (A) providing an electrochemical cell comprising an anode, a cathode, a cation selective membrane and a bipolar membrane, the bipolar membrane having an anion selective side facing the anode and a cation selective side facing the cathode, wherein the cation selective membrane is positioned between the anode and the bipolar membrane, and the bipolar membrane is positioned between the cation selective membrane and the cathode, thereby defining a feed compartment between the cation selective membrane and the anode, a recovery compartment between the bipolar membrane and the cation selective membrane, and a water compartment between the bipolar membrane and the cathode;
    (B) charging an ionic solution to the water compartment, and a solution to the recovery compartment;
    (C) charging the hydroxylammonium salt solution to the feed compartment;
    (D) passing a current through the electrochemical cell to produce hydroxylamine in the recovery compartment; and
    (E) recovering the hydroxylamine from the recovery compartment.

15. The process of claim 14, wherein the electrochemical cell further comprises a second cation selective membrane positioned between the bipolar membrane and the cation selective membrane, thereby defining a water compartment between the bipolar membrane and the cathode, a recovery compartment between the second cation selective membrane and the bipolar membrane, a purge compartment between the cation selective membrane and the second cation selective membrane, and a feed compartment between the anode and the cation selective membrane, wherein a second solution is charged to the purge compartment.

16. The method of claim 14, wherein the hydroxylammonium salt solution further comprises hydroxylamine.

17. The method of claim 14, wherein the hydroxylammonium salt solution comprises at least one of hydroxylammonium nitrate, hydroxylammonium sulfate, hydroxylammonium phosphate, and hydroxylammonium chloride.

18. The method of claim 14, wherein the hydroxylammonium salt solution comprises at least one of methylhydroxylamine hydrochloride, ethylhydroxylamine hydrochloride, propylhydroxylamine hydrochloride, isopropylhydroxylamine hydrochloride, and diethylhydroxylamine hydrochloride.

19. The method of claim 14, wherein the hydroxylammonium salt solution further comprises at least one of nitric acid, sulfuric acid, phosphoric acid and hydrochloric acid.

20. The method of claim 14, wherein the hydroxylammonium salt solution further comprises at least one stabilizer.

21. The method of claim 14 further comprising passing the recovered hydroxylamine through a reverse osmosis unit, ion exchange resin or distillation apparatus.

22. The method of claim 14, wherein the method is conducted under potentiostatic conditions.

23. The method of claim 14, wherein the hydroxylammonium salt solution is obtained from a process including the steps of:
    providing an electrochemical cell comprising an anode, a cathode and a separator thereby defining an anolyte compartment between the anode and the separator and a catholyte compartment between the cathode and the separator;
    charging a concentrated nitric acid solution to the catholyte compartment and a dilute nitric acid solution to the anolyte compartment;
    applying a current while maintaining a temperature below about 50° C.; and
    obtaining the hydroxylammonium salt solution from the catholyte compartment.

24. The method of claim 23, wherein the cathode comprises mercury.

25. A method of preparing hydroxylamine from a hydroxylammonium salt solution, comprising:
    (A) providing an electrochemical cell comprising an anode, a cathode, a anion selective membrane and a bipolar membrane, the bipolar membrane having an anion selective side facing the anode and a cation selective side facing the cathode, wherein the anion selective membrane is positioned between the anode and the bipolar membrane, and the bipolar membrane is positioned between the anion selective membrane and the cathode, thereby defining a feed-recovery compartment between the anion selective membrane and the bipolar membrane, a water compartment between the bipolar membrane and the cathode, and an acid compartment between the anion selective membrane and the anode;
    (B) charging an ionic solution to the water compartment, and a solution to the acid compartment;
    (C) charging the hydroxylammonium salt solution to the feed-recovery compartment;
    (D) passing a current through the electrochemical cell to produce hydroxylamine in the feed-recovery compartment; and
    (E) recovering hydroxylamine from the feed-recovery compartment.

26. The method of claim 25, wherein the hydroxylammonium salt solution further comprises hydroxylamine.

27. The method of claim 25, wherein the hydroxylammonium salt solution comprises at least one of hydroxylammonium nitrate, hydroxylammonium sulfate, hydroxylammonium phosphate, and hydroxylammonium chloride.

28. The method of claim 25, wherein the hydroxylammonium salt solution comprises at least one methylhydroxylamine hydrochloride, ethylhydroxylamine hydrochloride, propylhydroxylamine hydrochloride, isopropylhydroxylamine hydrochloride, and diethylhydroxylamine hydrochloride.

29. The method of claim 25, wherein the hydroxylammonium salt solution further comprises at least one of nitric acid, sulfuric acid, phosphoric acid and hydrochloric acid.

30. The method of claim 25, wherein the hydroxylammonium salt solution further comprises at least one stabilizer.

31. The method of claim 25 further comprising passing the recovered hydroxylamine through a reverse osmosis unit, ion exchange resin or distillation apparatus.

32. The method of claim 25, wherein the hydroxylammonium salt solution is obtained from a process including the steps of:

providing an electrochemical cell comprising an anode, a mercury cathode and a separator thereby defining an anolyte compartment between the anode and the separator and a catholyte compartment between the cathode and the separator;

charging a concentrated nitric acid solution to the catholyte compartment and a dilute nitric acid solution to the anolyte compartment;

applying a current while maintaining a temperature below about 50° C.; and obtaining the hydroxylammonium salt solution from the catholyte compartment.

* * * * *